US010223060B2

(12) United States Patent
 Karacas et al.

(10) Patent No.: US 10,223,060 B2
(45) Date of Patent: Mar. 5, 2019

(54) INTERACTIVE VIDEO MULTI-SCREEN EXPERIENCE ON MOBILE PHONES

(71) Applicant: Google Inc., Mountain View, CA (US)

(72) Inventors: Peter Karacas, New York, NY (US); James Sowden, Brooklyn, NY (US); Matthieu Lorrain, New York, NY (US); Bryan Rodman, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 69 days.

(21) Appl. No.: 15/243,877

(22) Filed: Aug. 22, 2016

(65) Prior Publication Data

US 2018/0052650 A1 Feb. 22, 2018

(51) Int. Cl.
 *H04N 5/44* (2011.01)
 *H04N 1/387* (2006.01)
 (Continued)

(52) U.S. Cl.
 CPC .......... *G06F 3/1446* (2013.01); *G06F 3/1431* (2013.01); *G06T 3/20* (2013.01); *G06T 7/33* (2017.01); *G09G 5/346* (2013.01); *H04N 1/3876* (2013.01); *H04N 5/4403* (2013.01); *H04N 21/21805* (2013.01); *H04N 21/41407* (2013.01); *H04N 21/4307* (2013.01); *H04N 21/4728* (2013.01); *H04N 21/6587* (2013.01); *G09G 2354/00* (2013.01); *G09G 2360/04* (2013.01); *G09G 2360/121* (2013.01);
 (Continued)

(58) Field of Classification Search
 CPC ............. H04N 21/218; H04N 21/4126; H04N 21/4135; H04N 21/414; H04N 21/41407; H04N 21/25825; H04N 2005/4425; H04N 2005/4408; H04N 5/4403; H04N 1/00307; G06F 1/1626; G06F 1/1446; G06T 3/20
 USPC ....... 725/61, 68, 143, 43, 39, 37; 348/14.03, 348/14.16, 564, 629, 838, 158, 208.15, 348/376, 520, 530, 540, 553, 569
 See application file for complete search history.

(56) References Cited

U.S. PATENT DOCUMENTS 10,069,882 B2 * 9/2018 Karacas ................ H04L 65/403
2005/0062844 A1 * 3/2005 Ferren ...................... H04N 7/15
348/14.08
(Continued)

OTHER PUBLICATIONS

PCT International Search Report & Written Opinion, RE: Application #PCT/US2017/048058, dated Oct. 24, 2017. 5 pages.

*Primary Examiner* — Paulos M Natnael
(74) *Attorney, Agent, or Firm* — Lowenstein Sandler LLP

(57) ABSTRACT

Video content items representing a video may be provided to a group of mobile devices to present the video on a combined display screen of the mobile devices. An indication of a user interaction performed at one of the mobile devices with respect to a corresponding video content item of the plurality of video content items that has been provided to the one of the mobile devices may be received. An action to change a display of other video content items of the video content items provided to other mobile devices of the group based on the indication of the user interaction with respect to the corresponding video content item may be determined. The action may be provided to the other mobile devices of the group to change the display of the other video content items provided to the other mobile devices of the group.

14 Claims, 8 Drawing Sheets

(51) Int. Cl.

| | |
|---|---|
| *G06T 3/20* | (2006.01) |
| *H04N 21/43* | (2011.01) |
| *H04N 21/414* | (2011.01) |
| *H04N 5/445* | (2011.01) |
| *G06F 3/00* | (2006.01) |
| *G06F 13/00* | (2006.01) |
| *G06F 3/14* | (2006.01) |
| *H04N 21/218* | (2011.01) |
| *G06T 7/33* | (2017.01) |
| *G09G 5/34* | (2006.01) |
| *H04N 21/6587* | (2011.01) |
| *H04N 21/4728* | (2011.01) |

(52) U.S. Cl.
CPC . *G09G 2370/022* (2013.01); *G09G 2370/025* (2013.01); *H04N 2005/4425* (2013.01)

(56) References Cited

U.S. PATENT DOCUMENTS

| | | | | |
|---|---|---|---|---|
| 2006/0288082 | A1* | 12/2006 | Rosenberg | G06Q 20/102 709/217 |
| 2008/0124053 | A1* | 5/2008 | Hutten | H04N 21/4432 386/326 |
| 2008/0192116 | A1* | 8/2008 | Tamir | G06T 7/292 348/157 |
| 2008/0216125 | A1* | 9/2008 | Li | H04N 13/0239 725/62 |
| 2009/0005032 | A1* | 1/2009 | Lunati | G06F 17/3028 455/426.1 |
| 2010/0014825 | A1* | 1/2010 | Curtis | G11B 27/10 386/248 |
| 2010/0073454 | A1* | 3/2010 | Lovhaugen | G06F 3/0486 348/14.03 |
| 2010/0076994 | A1* | 3/2010 | Soroca | G06F 17/30749 707/769 |
| 2011/0179440 | A1* | 7/2011 | Anderson, Jr. | H04H 20/61 725/25 |
| 2011/0304691 | A1* | 12/2011 | Newton | H04N 13/0018 348/43 |
| 2012/0280898 | A1 | 11/2012 | Lucero et al. | |
| 2012/0296652 | A1* | 11/2012 | Hill | H04N 21/42203 704/251 |
| 2013/0091298 | A1* | 4/2013 | Ozzie | H04W 4/206 709/231 |
| 2013/0234933 | A1* | 9/2013 | Reitan | G06F 3/011 345/156 |
| 2013/0340006 | A1* | 12/2013 | Kwan | H04N 5/445 725/39 |
| 2014/0184721 | A1* | 7/2014 | Zhang | H04N 7/15 348/14.02 |
| 2014/0313103 | A1 | 10/2014 | Goel et al. | |
| 2015/0195514 | A1* | 7/2015 | Kwon | H04N 13/0454 348/43 |
| 2015/0254045 | A1 | 9/2015 | Drake et al. | |
| 2015/0346857 | A1* | 12/2015 | Zhang | G06F 3/00 345/175 |
| 2015/0350703 | A1* | 12/2015 | Rynderman | H04N 21/234327 725/100 |
| 2015/0370893 | A1* | 12/2015 | Checkley | G06F 17/30828 707/721 |
| 2016/0191619 | A1* | 6/2016 | Wang | H04L 67/1095 709/204 |
| 2018/0054465 | A1* | 2/2018 | Karacas | H04L 65/403 |

* cited by examiner

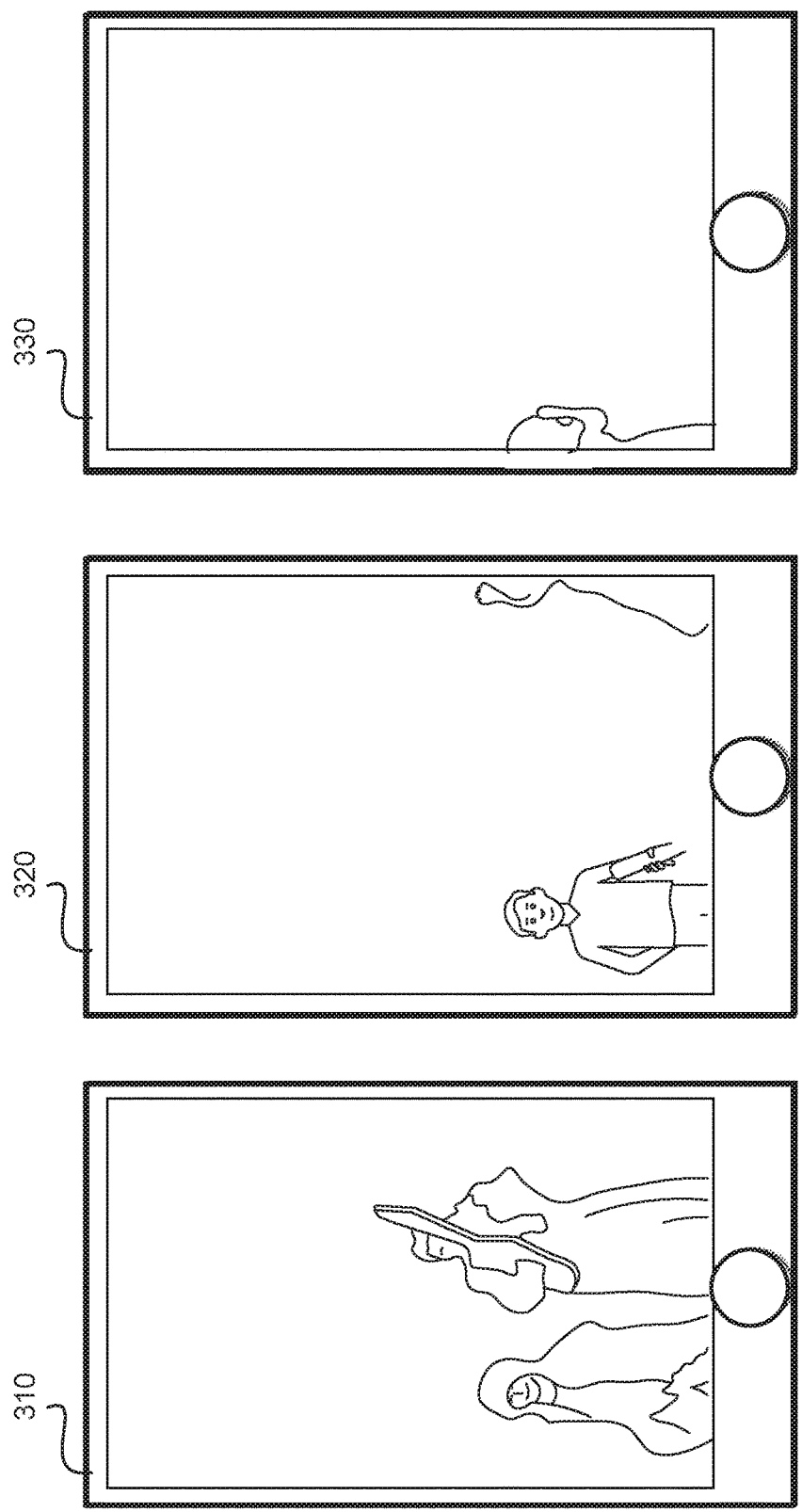

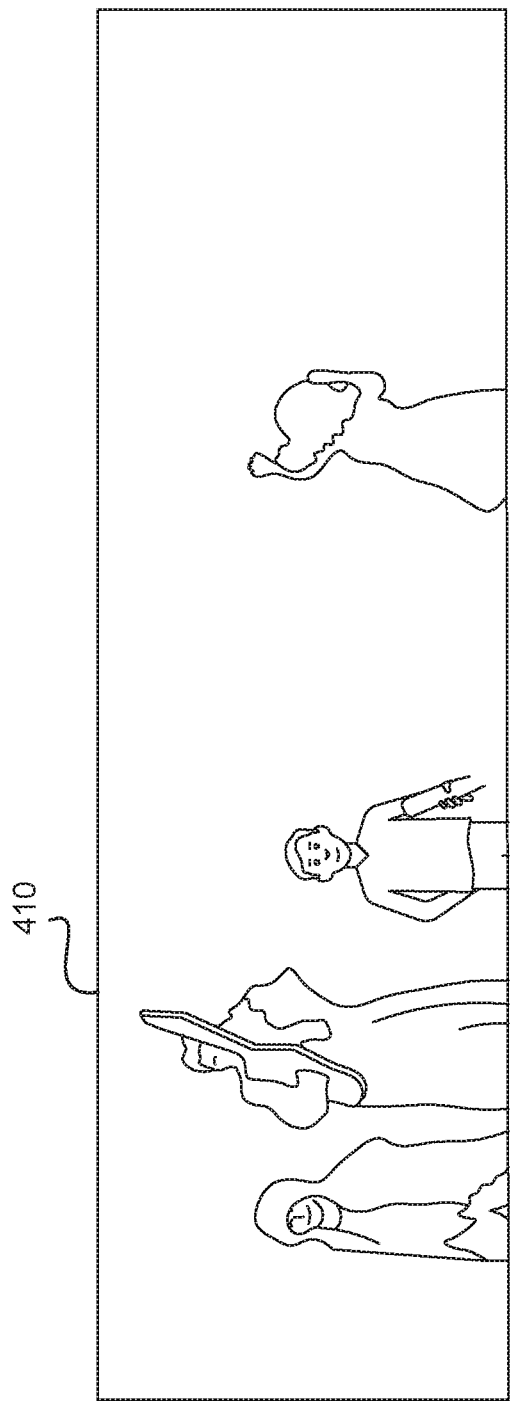

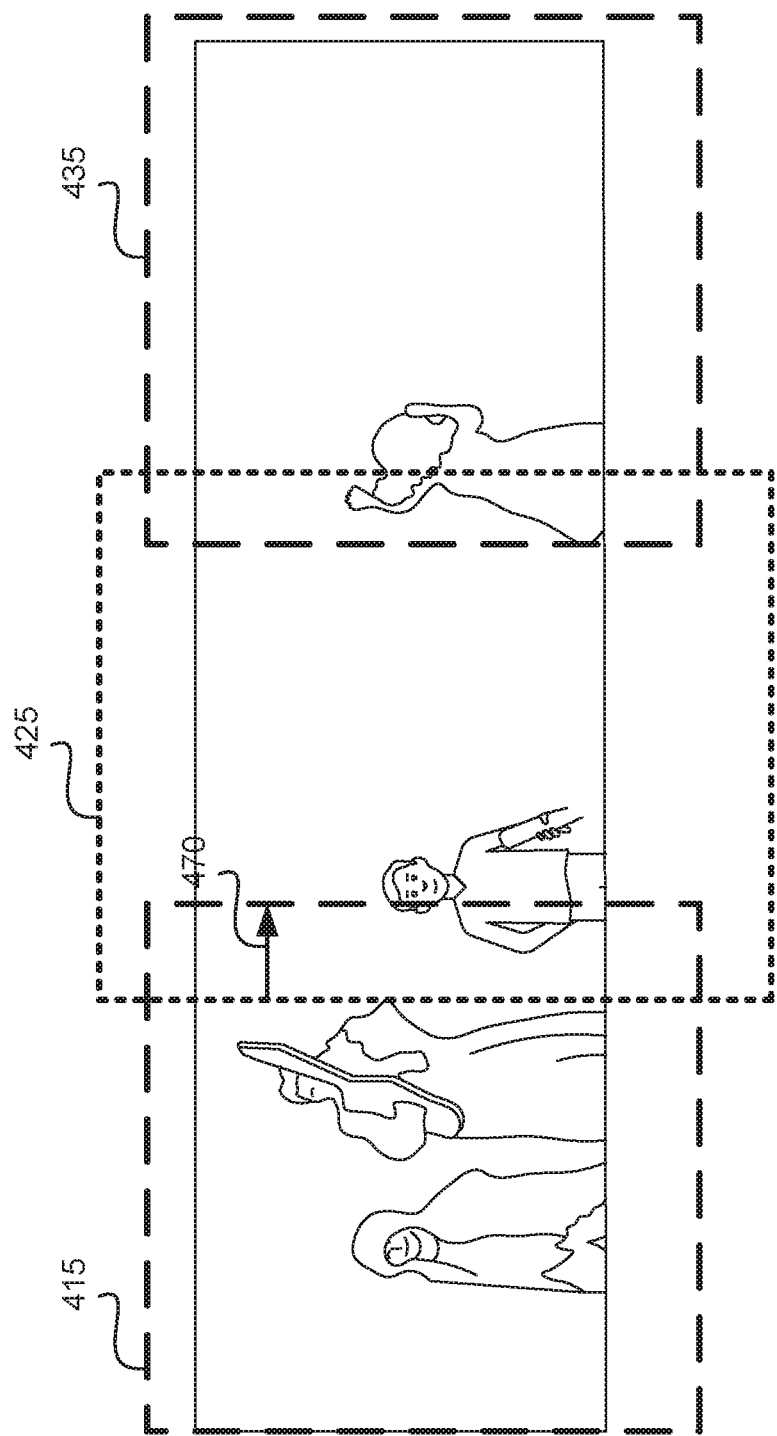

INTERACTIVE VIDEO MULTI-SCREEN EXPERIENCE ON MOBILE PHONES

TECHNICAL FIELD

This disclosure relates to the field of mobile devices and, in particular, to an interactive video multi-screen experience on mobile phones.

BACKGROUND

A video content item platform may provide a video content item to mobile devices. For example, a particular video content item may be transmitted or streamed to a first mobile device as well as to a second mobile device. Users of each of the first and second mobile devices may view the video content item that has been transmitted to their respective mobile device. Thus, the users may independently view the video content item without interacting with each other.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method to provide a plurality of video content items representing a video to a group of mobile devices to collectively present the video on a combined display screen comprising display screens of the mobile devices, receive an indication of a user interaction performed at one of the mobile devices of the group of mobile devices with respect to a corresponding video content item of the plurality of video content items that has been provided to the one of the mobile devices, determine an action to change a display of other video content items of the video content items provided to other mobile devices of the group based on the indication of the user interaction with respect to the corresponding video content item provided to the one of the mobile devices, and provide the determined action to the other mobile devices of the group of mobile devices to change the display of the other video content items provided to the other mobile devices of the group.

In some implementations, the user interaction is a panning action.

In some implementations, the determining of the action to change the other video content items comprises identifying a direction of the panning of the corresponding video content item that has been provided to the one of the mobile devices where the determining of the action is further based on the direction of the panning.

In some implementations, the action to the other mobile devices of the group specifies the panning action to be performed for each of the other video content items provided to the other mobile devices based on the direction of the panning of the corresponding video content item.

In some implementations, the panning of the corresponding video content item corresponds to a horizontal scrolling of the display of the corresponding video content item.

In some implementations, each of the video content items includes at least one overlap region with another video content item, and the panning of the corresponding video content item corresponds to changing the display of the respective video content item to display at least a portion of the overlap region.

In some implementations, the determining of the action to change the other video content items includes identifying an amount of the panning of the corresponding video content item that has been provided to the one of the mobile devices where the determining of the action is further based on the amount of the panning.

In some implementations, the amount of the panning corresponds to a horizontal scrolling of the corresponding video content item.

In some implementations, a non-transitory machine-readable storage medium storing instructions may be executed to cause a processing device to perform operations such as providing a plurality of video content items representing a video to a group of mobile devices to collectively present the video on a combined display screen comprising display screens of the mobile devices, receiving an indication of a user interaction performed at one of the mobile devices of the group of mobile devices with respect to a corresponding video content item of the plurality of video content items that has been provided to the one of the mobile devices, determining an action to change a display of other video content items of the video content items provided to other mobile devices of the group based on the indication of the user interaction with respect to the corresponding video content item provided to the one of the mobile devices, and providing the determined action to the other mobile devices of the group of mobile devices to change the display of the other video content items provided to the other mobile devices of the group.

In some implementations, a system may include a memory and a processing device coupled with the memory. The processing device may stream a plurality of video content items representing a video to a group of mobile devices to collectively present the video on a combined display screen comprising display screens of the mobile devices, receive an indication of a user interaction performed at one of the mobile devices of the group of mobile devices with respect to a corresponding video content item of the plurality of video content items that is being streamed to the one of the mobile devices, determine an action to change the display other video content items of the video content items being streamed to other mobile devices of the group based on the indication of the user interaction with respect to the corresponding video content item being streamed to the one of the mobile devices, and change the streaming of the other video content items being streamed to the other mobile devices of the group of mobile devices to change the display of the other video content items at the other mobile devices of the group based on the determined action.

BRIEF DESCRIPTION OF THE DRAWINGS

The present disclosure is illustrated by way of example, and not by way of limitation, in the figures of the accompanying drawings.

FIG. 3 illustrates a group of mobile devices displaying received video content items in accordance with some implementations.

FIG. 4A illustrates an example of a scene represented by video content items received by mobile devices in accordance with some implementations.

FIG. 4B illustrates an example of video content items corresponding to portions of the scene in accordance with some implementations.

DETAILED DESCRIPTION

Figure 1:
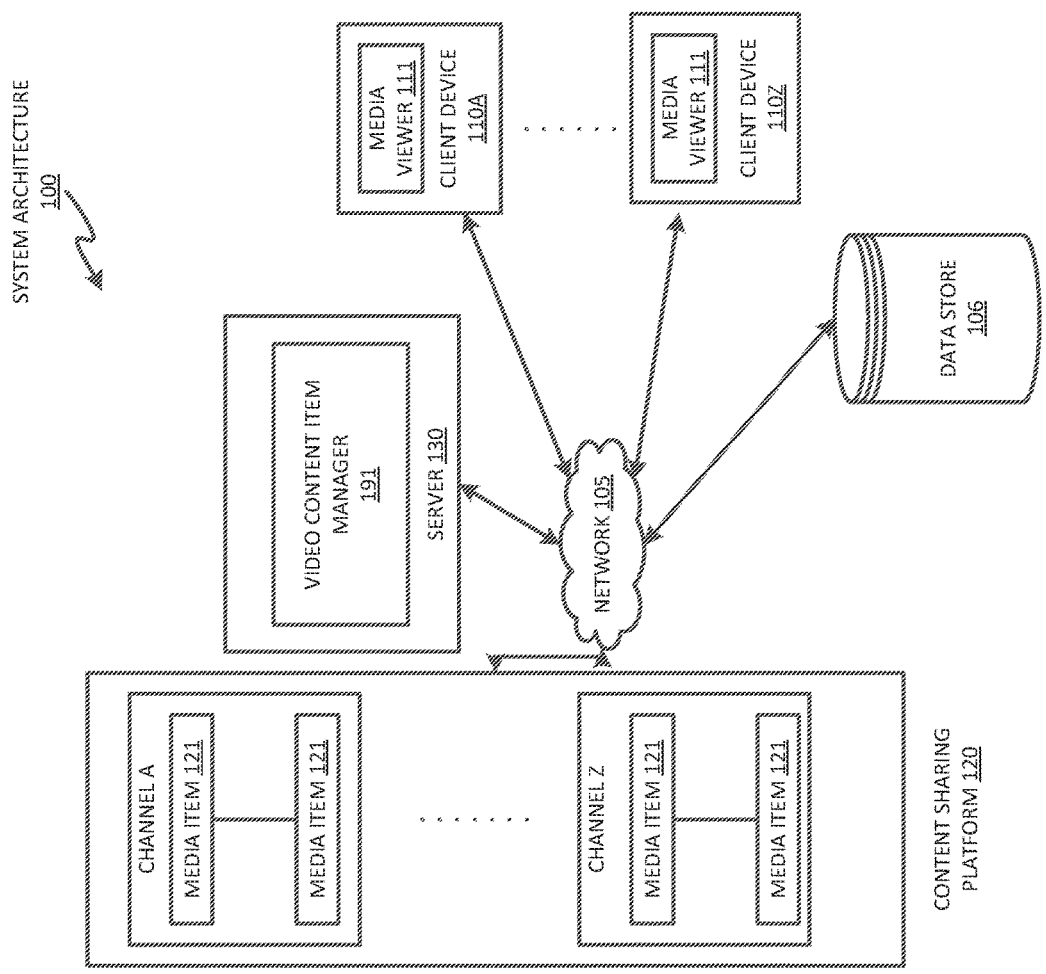
FIG. 1 illustrates an example system architecture in which implementations of the present disclosure may operate.

Aspects of the present disclosure are directed to providing a set of video content items to a group of mobile devices. In general, multiple mobile devices may be combined together to provide a big screen experience for displaying a video represented by multiple video content items. In order to present scenes of a video on display screens of the mobile devices, multiple video content items representing the video can be provided (e.g., streamed) to the mobile devices. Each of the mobile devices may be used to display a portion of a scene of the video on the display screen of each of the mobile devices. As an example, a first video content item corresponding to a left portion of the scene may be provided to a first mobile device, a second video content item corresponding to a center portion of the scene may be provided to a second mobile device, and a third video content item corresponding to a right portion of the scene may be provided to the third mobile device. Thus, a representation of the scene may be split across multiple mobile devices.

A user of one of the mobile devices may interact with the video content item received by the respective mobile device. For example, a user of the first mobile device that receives the first video content item may interact with the first video content item by panning the first video content item to change a view or a portion of the first video content item that is displayed by the first mobile device. The panning may correspond to the user performing a horizontal scrolling touch action on the display of the first mobile device when the first video content item is being displayed. Since each of the video content items represents a portion of a scene, the interaction of the user with the first video content item may need to be reproduced by users of the other mobile devices to properly represent the scene across all of the mobile devices. For example, each user of the other mobile devices may need to similarly perform the panning action to change a view or portion of the respective video content item that is displayed by each mobile device. Such user interactions may interrupt the viewing experience of the scene displayed across the mobile devices. For example, users may spend time to reproduce the panning action instead of viewing the scene represented by the video content items. Thus, the shared viewing experience of the scene by the users across the mobile devices may be interrupted.

Aspects of the present disclosure address the above and other deficiencies by automatically propagating a user interaction with a scene on one mobile device to the other mobile devices. In particular, an indication of a user interaction (e.g., the panning action) being performed at one of the mobile devices that is provided one of the video content items may be received. A corresponding action for the other mobile devices being provided the other video content items of the scene may be determined and transmitted to the other mobile devices. For example, the indication of the user interaction may specify that a user of a first mobile device has performed a panning action to change the view or display of a first video content item in a particular direction and for a particular amount. A corresponding action for each of the mobile devices may similarly indicate to change a respective video content item received by each of the other mobile devices in the same direction and for the same amount.

As an example, an indication of a user interaction to pan a first video content item provided to a first mobile device in a group of mobile devices in a rightwards direction for a particular amount may be received. A corresponding action to pan a second video content item and a third video content item received by other mobile devices (e.g., a second mobile device and a third mobile device in the same group of mobile devices) may be determined. The corresponding action may specify to perform a panning action in the rightwards direction for the particular amount and the corresponding action may be transmitted to the second and third mobile devices to change a display of the respective second and third video content items by the second and third mobile devices.

Aspects of the present disclosure may thus provide a connected display screen experience that is engaging and collaborative for users of the mobile devices. The interaction between the video content items may provide users of the mobile devices to interact and communicate with users of the other mobile devices and thus provide a more engaging video viewing experience for users.

FIG. 1 illustrates an example system architecture 100, in accordance with one implementation of the disclosure. The system architecture 100 includes client devices (e.g., mobile devices) 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, network connected televisions, netbook computers etc. In some implementations, client device 110A through 110Z may also be referred to as "user devices" or "mobile devices." Each client device includes a media viewer 111. In one implementation, the media viewers 111 may be applications that allow users to view content, such as images, videos (e.g., video content items), web pages, documents, etc. For example, the media viewer 111 may be a web browser that can access, retrieve, present, and/or navigate content (e.g., web pages such as Hyper Text Markup Language (HTML)

pages, digital media items or content items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media content items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that communicate with the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content sharing platform 120 may allow a user to consume, upload, search for, approve of ("like"), dislike, and/or comment on media items. In some embodiments, the content sharing platform 120 may provide a scene that is represented by multiple video content items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121 (i.e., content items or video content items). Examples of a media item 121 can include, and are not limited to, digital video, digital movies, digital photos, images, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a video content item.

A media item 121 may be consumed via the Internet and/or via a mobile device application. For brevity and simplicity, an online video (also hereinafter referred to as a video content item) is used as an example of a media item 121 throughout this document. As used herein, "media," "media item," "online media item," "digital media," "digital media item," "content," "content item," and "video content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). The server 130 may be included in the content sharing platform 120 or be part of a different system. The server 130 may host video content item manager 191 that provides video content items to the client devices 110A to 110Z, and subsequently provides a media item 121 to the client devices. For example, the video content item manager 191 may provide different video content items to each of the client devices and may change the presentation of one or more of the video content items in response to an interact with another one of the video content items at one of the client devices. Further details with regard to the video content item manager 191 are disclosed below.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, a user's purchase transaction history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
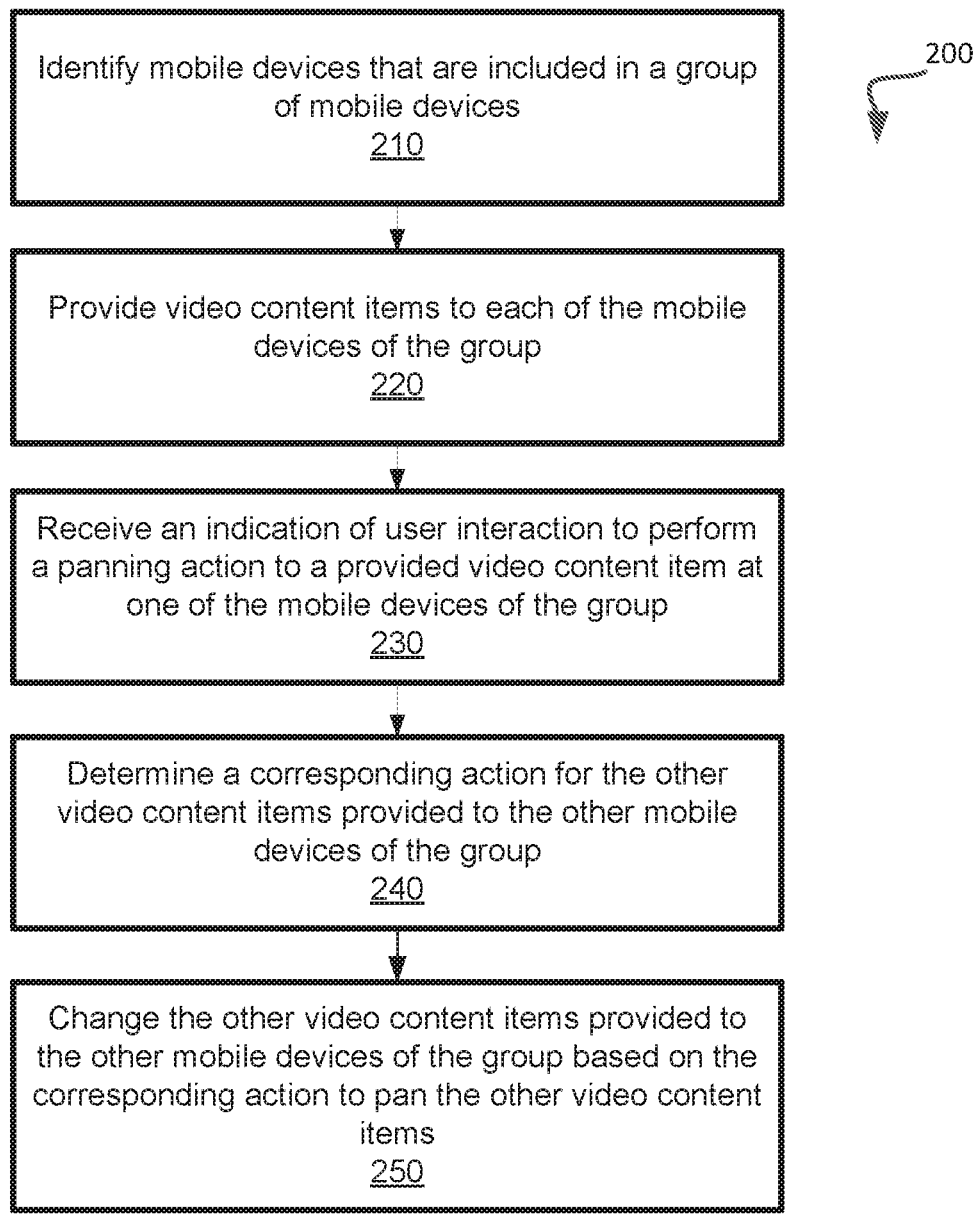
FIG. 2 is a flow diagram of an example method to provide video content items to a group of mobile devices in accordance with some implementations.

FIG. 2 is a flow diagram of an example method 200 to provide video content items to a group of mobile devices. In general, the method 200 may be performed by processing logic that may include hardware (e.g., processing device, circuitry, dedicated logic, programmable logic, microcode, etc.), software (e.g., instructions run on a processing device), or a combination thereof. In some implementations, the method 200 may be performed by the video content item manager 191 of FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 2, the method 200 may begin with the processing logic identifying mobile devices that are included in a group of mobile devices (block 210). The group may be created to collectively present a video on a large display screen resulting from the combining of the display screens of the mobile devices. For example, a first mobile device may initiate or create a group of mobile devices and additional mobile devices may join the group of mobile devices. The first mobile device that created the group and the additional mobile devices may be considered to be mobile devices that are included in the group. In some embodiments, the additional mobile devices may join the group by providing a request that identifies the group and specifies a code or password for joining the group. The processing logic may further provide video content items representing the video to the mobile devices of the group (block 220). The video content items may represent different portions of a scene of the video. For example, a first video content item representing a left portion of the scene may be provided to a first mobile device, a second video content item representing a center portion of the same scene may be provided to a second mobile device, and a third video content item representing a right portion of the same scene may be provided to a third mobile device. Each representation of a portion of the scene may be adjacent to at least another representation of another portion of the scene. For example, the left portion may be adjacent to the center portion that may be adjacent to both the left portion and the right portion.

In some embodiments, the video content items provided to the mobile devices in the group may correspond to an amount of overlap between the video content items. For example, the first video content may represent a first amount of the scene and the second video content item may represent a second amount of the scene. The first amount of the scene and the second amount of the scene may include a common portion that is included in both the first video content item and the second video content item while the first video content includes an additional portion of the scene that is not included in the second video content item and the second video content item may include another portion of the scene that is not included in the first video content item. Further details with regard to the overlap of video content items are described in conjunction with FIG. 4B.

Referring to FIG. 2, the processing logic may further receive an indication of user interaction to perform a panning action with respect to a provided video content item at one of the mobile devices of the group (block 230). The user interaction may be a swiping motion or touch motion on a display screen of the mobile device when the corresponding video content item is being displayed. The user interaction may specify to pan the video content item so that the representation of the scene changes across a horizontal axis. For example, a viewing angle of the representation of the scene may be changed in response to the panning action. The processing logic may further determine a corresponding action for the other video content items that are provided to the other mobile devices of the group (block 240). The corresponding action may perform the same panning action for each other mobile device in the group. For example, the user interaction may specify to pan the video content item in a particular direction for a particular amount (e.g., an amount corresponding to a horizontal scrolling of the video content item). The corresponding action may be to pan each other video content item provided to each other mobile device in the group in the same particular direction for the same particular amount. Thus, the panning action may be replicated across other mobile devices in response to a user interaction at one of the mobile devices.

In some embodiments, the user interaction may correspond to a movement of the mobile device. For example, the user interaction may correspond to shaking the mobile device or another physical interaction with the mobile device. The corresponding action may be to change a display of the other video content items provided at the other mobile devices. For example, in response to a shaking of a first mobile device that is provided a first video content item, the second video content item provided at a second mobile device may change (e.g., a confetti graphic may be provided over the display of the second video content item). Thus, a physical movement of a first mobile device that is displaying a first video content item may result in a change of the display of a second video content item that is being displayed by a second mobile device. In some embodiments, the physical movement of the first mobile device may change the display of each video content item being provided to each of the other mobile devices in the group that includes the first mobile device. In the same or alternative embodiments, the user interaction may correspond to changing the video content item and the corresponding action may be to change the other video content items based on the change. For example, a changing of a video content item being displayed on a first mobile device from a first representation of the first portion of a scene to a second representation of the first portion of the scene (e.g., a change in a color video to a black and white video depicting the first portion of the scene) may result in a similar change in the video content items being displayed at the other mobile devices (e.g., a change to the black and white video for each respective portion of the scene).

In some embodiments, a data store may include a list of actions or user interactions and may specify a change to other video content items provided to other mobile devices based on the listed action or user interaction. For example, the data store may specify that for a particular action (e.g., a physical movement of a mobile device), the other video content items provided to other mobile devices may change the display of the corresponding video content items.

As shown in FIG. 2, the processing logic may further change the other video content items provided to the other mobile devices of the group based on the corresponding action to pan the other video content items (block 250). For example, the corresponding action may be provided to each of the other mobile devices to change the display of the corresponding video content item as an instruction to be performed by the respective mobile device. In some embodiments, the corresponding action may result in the changing of the providing of the other video content items by changing the video content item that is provided or streamed to the other mobile devices from a server over a network. Thus, the corresponding action may change a portion of a video content item that is currently being displayed to another portion of the video content item or the corresponding action may change the streaming or transmitting (from a server to the respective mobile devices) of the video content item from a portion corresponding to a first portion of the scene to a second portion of the scene. For example, in response to a user interaction corresponding to panning a video content item that is being streamed to a mobile device in a particular direction, the same panning action in the same direction may be applied to other video content items representing different portions of the video and that are being streamed to other mobile devices.

FIG. 3 illustrates a group of mobile devices displaying received video content items representing a video, according to some aspects of the disclosure. In particular, the group of mobile devices 310, 320, and 330 may receive video content items representing the video from the video content item manager 191 of FIG. 1, and simultaneously display these video content items on the display screens of the mobile devices 310, 320, and 330 to provide a big screen experience for displaying the video.

As shown in FIG. 3, a scene of a video (e.g., a music concert or performance) may be represented across multiple mobile devices. For example, the first mobile device 310 may receive and display a first video content item representing a left portion of the scene, the second mobile device 320 may receive and display a second video content item representing a center portion of the scene, and the third mobile device 330 may receive and display a third video content item representing a right portion of the scene. Although FIG. 3 illustrates three mobile devices, any number of mobile devices may be used to display different portions of the scene. As shown, the scene may be split or divided among the three mobile devices 310, 320, and 330.

FIG. 4A illustrates an example scene 410 of the video that may be represented by multiple video content items provided to different mobile devices. For example, as shown, the scene 410 may correspond to the scene represented across the mobile devices 310, 320, and 330 of FIG. 3.

FIG. 4B illustrates different portions of the scene 410 of the video that are provided to the different mobile devices by different video content items. For example, a first video content item 415 may represent a first portion of the scene of the video, a second video content item 425 may represent a second portion of the scene, and a third video content item 435 may represent a third portion of the scene. As shown, each of the video content items 415, 425, and 435 may overlap with at least a portion of another video content item. For example, as shown, the first video content item 415 may overlap by an amount 470 with the second video content item 425 and the third video content item 435 may overlap by the same amount with the second video content item 425. The overlap may correspond to a portion of the scene that is present or included in two of the video content items. Thus, the first video content item that is provided to a first mobile device and the second video content item that is provided to a second mobile device may include a duplicate region of the scene.

Figure 4C:
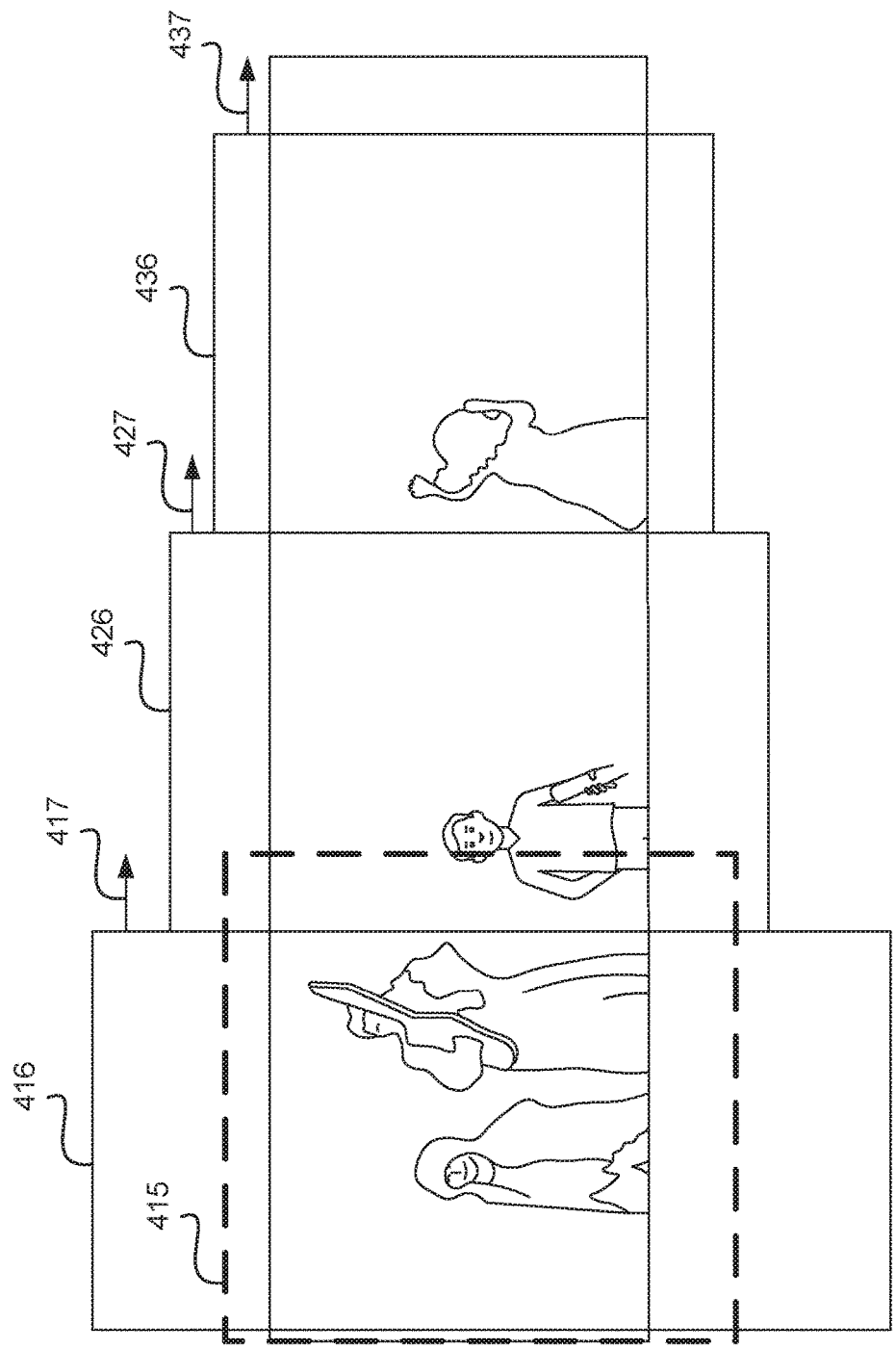
FIG. 4C illustrates an example of the panning of video content items in accordance with some implementations.

FIG. 4C illustrates an example of the panning of video content items. For example, when a video content item is provided to a mobile device, a portion of the scene represented by the video content item may be displayed. As shown, at a first time, a portion 416 of the first video content item 415 may be displayed, a portion 426 of a second video content item may be displayed, and a portion 436 of the third video content item may be displayed. Thus, at a first time, a portion of each video content item may be displayed while another portion of each of the video content items is not displayed.

As previously described, a panning action may correspond to a horizontal scrolling of the display of a video content item. For example, a panning action 417 may correspond to moving the portion 416 of the first video content item that is displayed by an amount 417 of the panning action. In response to the panning action, the portion 416 of the first video content item 415 that is displayed may change or shift in the direction of the panning action by the amount 417. In response to the panning action, the portion 426 of the second video content item may similarly shift by an amount 427 and the portion 436 of the third video content item may also shift by an amount 437. The amount 427 and the amount 437 may be the same as the amount 417 corresponding to the panning action performed on the first video content item 415. Thus, at a second time and in response to the panning action on the first video content item 415, the portions of the second video content item and the third video content that are displayed may also shift or change automatically (without any user interaction with respect to the second and third video content items).

Figure 5:
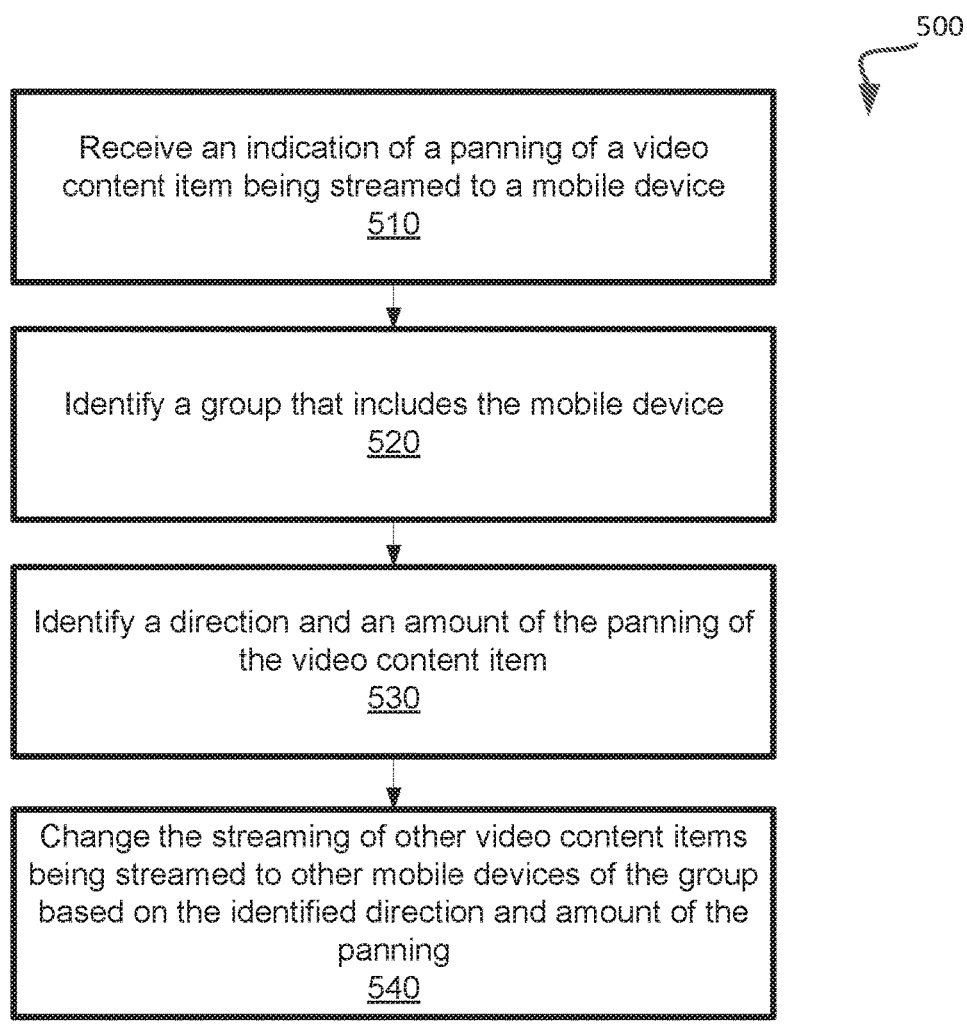
FIG. 5 is a flow diagram of an example method to change a streaming of video content items to mobile devices in accordance with some implementations.

FIG. 5 is a flow diagram of an example method to change a streaming of video content items to mobile devices. In general, the method 500 may be performed by processing logic that may include hardware (e.g., processing device, circuitry, dedicated logic, programmable logic, microcode, etc.), software (e.g., instructions run on a processing device), or a combination thereof. In some implementations, the method 500 may be performed by the video content item manager 200 of FIG. 1.

As shown in FIG. 5, the method 500 may begin with the processing logic receiving an indication of a panning of a video content item being streamed to a mobile device (block 510). For example, the panning action may be performed on the video content item as it is being displayed and streamed to the mobile device. In response to receiving the indication of the panning of the video content item, the processing logic may identify a group that includes the mobile device (block 520). In some embodiments, the indication of the panning may identify the group (e.g., the indication transmitted from the mobile device to a server may include an identifier of the group). The group may include at least one additional mobile device that has requested to join the group as previously described. The processing logic may further identify a direction and an amount of the panning of the video content item (block 530) and may further change the streaming of the other video content items being streamed to the other mobile devices of the group based on the identified direction and the amount of the panning (block 540). For example, the other video content items that are being streamed may change the portions of the other video content items that are streamed and displayed to the other mobile devices. For example, the same panning action may be replicated with respect to the other streams of the other video content items that are provided to the other mobile devices.

Figure 6:
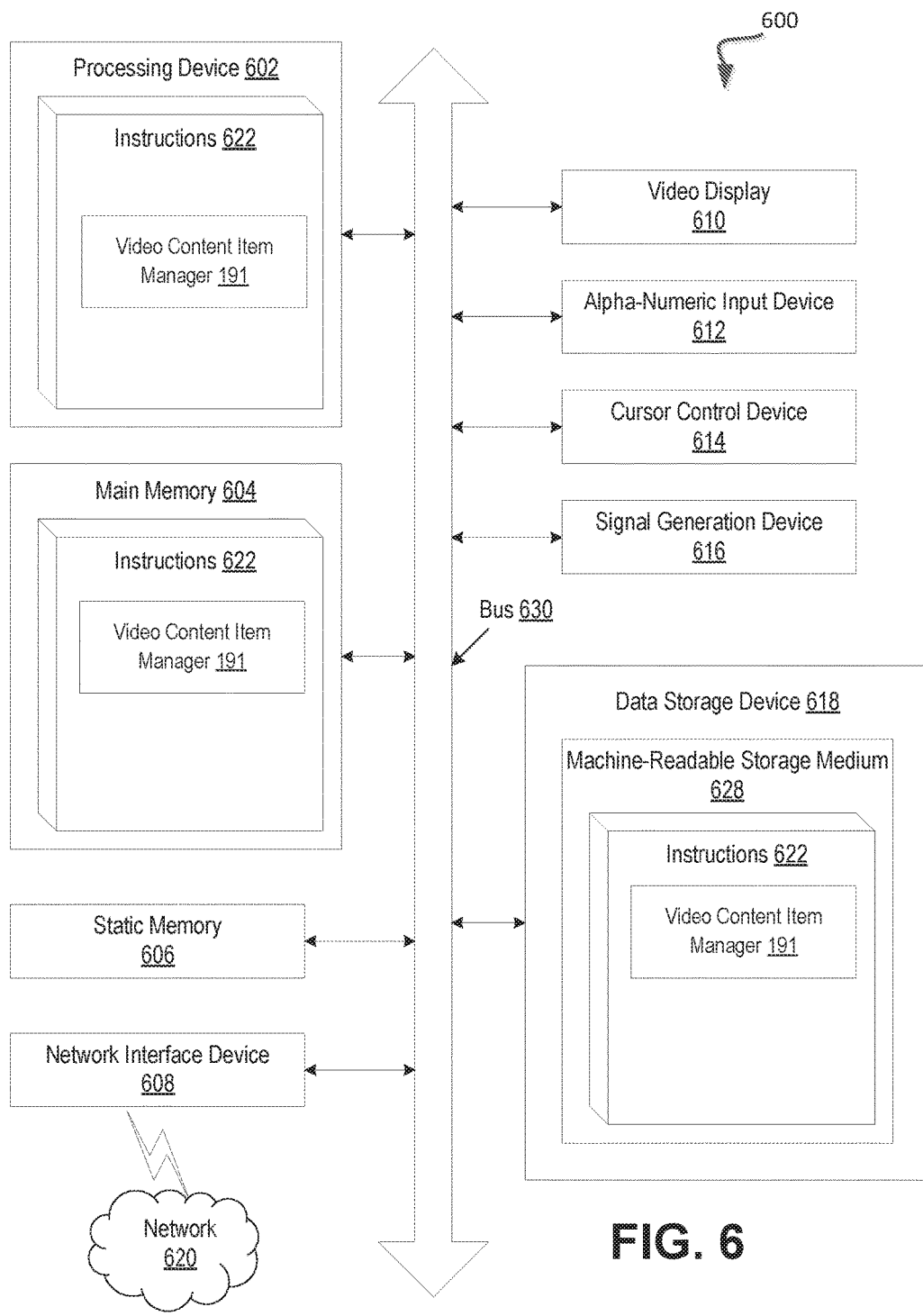
FIG. 6 illustrates a block diagram of an implementation of a computer system in which some implementations of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM, etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a video content item manager (e.g., video content item manager 191 of FIG. 1) and/or a software library containing methods that functionality in a video content item manager. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "providing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
providing a plurality of video content items representing a video to a group of mobile devices to collectively present the video on a combination of display screens of the mobile devices of the group;
receiving an indication of a user interaction corresponding to a panning action performed with respect to a corresponding video content item of the plurality of video content items that has been provided to one of the mobile devices of the group of mobile devices;
determining, by a processing device, an action to change a display of other video content items of the video content items provided to other mobile devices of the group based on a direction of the panning action performed with respect to the corresponding video content item provided to the one of the mobile devices; and
providing the determined action to the other mobile devices of the group of mobile devices to change the display of the other video content items provided to the other mobile devices of the group.

2. The method of claim 1, wherein the action to the other mobile devices of the group specifies the panning action to be performed for each of the other video content items provided to the other mobile devices based on the direction of the panning of the corresponding video content item.

3. The method of claim 1, wherein the panning of the corresponding video content item corresponds to a horizontal scrolling of the display of the corresponding video content item.

4. The method of claim 1, wherein each of the video content items comprises at least one overlap region with another video content item, and wherein the panning of the corresponding video content item corresponds to changing the display of the corresponding video content item to display at least a portion of the overlap region.

5. The method of claim 1, wherein the determining of the action to change the other video content items comprises:
identifying an amount of the panning of the corresponding video content item that has been provided to the one of the mobile devices, wherein the determining of the action is further based on the amount of the panning.

6. A non-transitory machine-readable storage medium storing instructions which, when executed, cause a processing device to perform operations comprising:
providing a plurality of video content items representing a video to a group of mobile devices to collectively present the video on a combination of display screens comprising display screens of the mobile devices of the group;
receiving an indication of a user interaction corresponding to a panning action performed with respect to a corresponding video content item of the plurality of video content items that has been provided to one of the mobile devices of the group of mobile devices;
determining an action to change a display of other video content items of the video content items provided to other mobile devices of the group based on a direction of the panning action performed with respect to the corresponding video content item provided to the one of the mobile devices; and
providing the determined action to the other mobile devices of the group of mobile devices to change the display of the other video content items provided to the other mobile devices of the group.

7. The non-transitory machine-readable storage medium of claim 6, wherein the action to the other mobile devices of the group specifies the panning action to be performed for each of the other video content items provided to the other mobile devices based on the direction of the panning of the corresponding video content item.

8. The non-transitory machine-readable storage medium of claim 6, wherein the panning of the corresponding video content item corresponds to a horizontal scrolling of the display of the corresponding video content item.

9. The non-transitory machine-readable storage medium of claim 6, wherein each of the video content items comprises at least one overlap region with another video content item, and wherein the panning of the corresponding video content item corresponds to changing the display of the corresponding video content item to display at least a portion of the overlap region.

10. The non-transitory machine-readable storage medium of claim 6, wherein to determine the action to change the other video content items, the processing device is further to:
identify an amount of the panning of the corresponding video content item that has been provided to the one of the mobile devices, wherein the determining of the action is further based on the amount of the panning.

11. A system comprising:
a memory; and a processing device, operatively coupled with the memory, to:

stream a plurality of video content items representing a video to a group of mobile devices to collectively present the video on a combination of display screens of the mobile devices of the group;

receive an indication of a user interaction corresponding to a panning action performed with respect to a corresponding video content item of the plurality of video content items that is being streamed to one of the mobile devices of the group of mobile devices;

determine an action to change the display other video content items of the video content items being streamed to other mobile devices of the group based on a direction of the panning action performed with respect to the corresponding video content item being streamed to the one of the mobile devices; and change the streaming of the other video content items being streamed to the other mobile devices of the group of mobile devices to change the display of the other video content items at the other mobile devices of the group based on the determined action.

12. The system of claim 11, wherein the action specifies the panning action to be performed for each of the other video content items being streamed to the other mobile devices based on the direction of the panning of the corresponding video content item.

13. The system of claim 11, wherein the panning of the corresponding video content item corresponds to a horizontal scrolling of the display of the corresponding video content item.

14. The system of claim 11, wherein each of the video content items comprises at least one overlap region with another video content item, and wherein the panning of the respective video content item corresponds to changing the display of the corresponding video content item to display at least a portion of the overlap region.

* * * * *